(12) United States Patent
Swiszcz et al.

(10) Patent No.: US 11,186,070 B2
(45) Date of Patent: Nov. 30, 2021

(54) ROOM DARKENING MATERIAL AND ARCHITECTURAL COVERING MADE FROM SAME

(71) Applicant: HUNTER DOUGLAS, INC., Pearl River, NY (US)

(72) Inventors: Paul G. Swiszcz, Niwot, CO (US); Kevin Dann, Englewood (CO); Michael J. Siebenaller, Broomfield, CO (US)

(73) Assignee: HUNTER DOUGLAS INC., Pearl River, NY (US)

( * ) Notice: Subject to any disclaimer, the term of this patent is extended or adjusted under 35 U.S.C. 154(b) by 126 days.

(21) Appl. No.: 15/888,194

(22) Filed: Feb. 5, 2018

(65) Prior Publication Data

US 2018/0222166 A1    Aug. 9, 2018

Related U.S. Application Data

(60) Provisional application No. 62/455,189, filed on Feb. 6, 2017.

(51) Int. Cl.
*B32B 27/12* (2006.01)
*B32B 5/02* (2006.01)
(Continued)

(52) U.S. Cl.
CPC ............... *B32B 27/12* (2013.01); *B32B 5/02* (2013.01); *B32B 5/022* (2013.01); *B32B 7/12* (2013.01);
(Continued)

(58) Field of Classification Search
CPC .... E06B 2009/2627; E06B 9/24; E06B 9/262; E06B 9/386; B32B 15/08; B32B 15/12; B32B 27/10; Y10T 442/656
(Continued)

(56) References Cited

U.S. PATENT DOCUMENTS 4,391,865 A * 7/1983 Constance ............. A47H 21/00
428/74
4,409,275 A   10/1983 Samowich
(Continued)

FOREIGN PATENT DOCUMENTS

CN    86208655 U  † 12/1987
CN    87215394 U  †  9/1988
(Continued)

OTHER PUBLICATIONS

PolyPrint (Optical Densitywww.polyprint.com: accessed Nov. 5, 2019).*

(Continued)

*Primary Examiner* — Alicia J Sawdon
(74) *Attorney, Agent, or Firm* — Dority & Manning, P.A.

(57) ABSTRACT

A light blocking or blackout composite material is described. The light blocking material includes at least two metalized layers. In one embodiment, a polymer film is coated on both sides with a first metalized layer and a second metalized layer. The metalized layers may have matching or different optical densities. Other layers can be combined with the metalized layers in order to provide a finished surface and/or to protect the metalized layers.

12 Claims, 9 Drawing Sheets

(51) Int. Cl.
  *E06B 9/24* (2006.01)
  *B32B 7/12* (2006.01)
  *B32B 27/08* (2006.01)
  *B32B 27/40* (2006.01)
  *B32B 15/20* (2006.01)
  *B32B 15/095* (2006.01)
  *B32B 15/14* (2006.01)
  *B32B 27/30* (2006.01)
  *B32B 15/08* (2006.01)
  *B32B 15/082* (2006.01)
  *B32B 27/36* (2006.01)
  *E06B 9/262* (2006.01)
  *E06B 9/386* (2006.01)

(52) U.S. Cl.
  CPC ............ *B32B 15/08* (2013.01); *B32B 15/082* (2013.01); *B32B 15/095* (2013.01); *B32B 15/14* (2013.01); *B32B 15/20* (2013.01); *B32B 27/08* (2013.01); *B32B 27/308* (2013.01); *B32B 27/36* (2013.01); *B32B 27/40* (2013.01); *E06B 9/24* (2013.01); *E06B 9/262* (2013.01); *E06B 9/386* (2013.01); *B32B 2255/10* (2013.01); *B32B 2255/205* (2013.01); *B32B 2255/26* (2013.01); *B32B 2255/28* (2013.01); *B32B 2307/40* (2013.01); *B32B 2307/4023* (2013.01); *B32B 2307/4026* (2013.01); *B32B 2307/41* (2013.01); *B32B 2307/412* (2013.01); *B32B 2307/414* (2013.01); *B32B 2307/718* (2013.01); *B32B 2419/00* (2013.01); *B32B 2451/00* (2013.01); *E06B 2009/2627* (2013.01)

(58) Field of Classification Search
  USPC .......................................................... 428/90
  See application file for complete search history.

(56) References Cited

U.S. PATENT DOCUMENTS

| | | | |
|---|---|---|---|
| 4,467,005 A | 8/1984 | Pasch et al. | |
| 4,645,704 A | 2/1987 | Hellwig | |
| 4,657,807 A | 4/1987 | Fuerstman | |
| 4,915,763 A | 4/1990 | Swiszcz | |
| 5,393,598 A | 2/1995 | Schlecker | |
| 5,503,210 A * | 4/1996 | Colson | B29C 65/524 160/84.05 |
| 6,159,875 A | 12/2000 | Jetzer et al. | |
| 6,890,883 B2 | 5/2005 | Pearce | |
| 7,057,805 B2 * | 6/2006 | Phillips | G02B 1/111 359/360 |
| 2002/0142684 A1 * | 10/2002 | Miska | D06M 13/03 442/63 |
| 2004/0170800 A1 * | 9/2004 | Richards | B32B 27/304 428/90 |
| 2005/0123769 A1 † | 6/2005 | Shively | |
| 2006/0040091 A1 * | 2/2006 | Bletsos | C23C 14/562 428/137 |
| 2008/0009214 A1 * | 1/2008 | Aigner | B32B 27/10 442/378 |
| 2008/0050565 A1 * | 2/2008 | Gross | D04H 1/425 428/212 |
| 2008/0311349 A1 * | 12/2008 | Johnson | C23C 14/20 428/172 |
| 2010/0098943 A1 | 4/2010 | Temchenko et al. | |
| 2011/0297332 A1 * | 12/2011 | Rupel | E06B 9/262 160/84.05 |
| 2012/0080080 A1 * | 4/2012 | Shalit | G02B 5/223 136/252 |
| 2014/0053989 A1 | 2/2014 | Colson et al. | |

FOREIGN PATENT DOCUMENTS

| | | | |
|---|---|---|---|
| CN | 2176901 Y † | 9/1994 | |
| CN | 203805423 | 9/2014 | |
| CN | 104972716 | 10/2015 | |
| JP | 2915471 B2 † | 7/1999 | |
| JP | 2002241482 A * | 8/2002 | |
| JP | 2016032907 A † | 3/2016 | |
| KR | 200434169 | 12/2006 | |
| WO | WO 90/05233 | 5/1990 | |
| WO | WO 90/13728 | 11/1990 | |
| WO | WO-2016002869 A1 * | 1/2016 | ............ E06B 9/303 |
| WO | WO2016/210312 | 12/2016 | |

OTHER PUBLICATIONS

European Search Report for Application No. 18155356.1, dated Oct. 22, 2018, 12 pages.
Dmz158, "Overview of vacuum aluminizing films", Aug. 26, 2007, Web page <https://max.book118.com/html/2016/0412/40265442.shtm>.†

\* cited by examiner
† cited by third party

ROOM DARKENING MATERIAL AND ARCHITECTURAL COVERING MADE FROM SAME

RELATED APPLICATIONS

The present application is based on and claims priority to U.S. Provisional Patent application Ser. No. 62/455,189, filed on Feb. 6, 2017, which is incorporated herein by reference.

BACKGROUND

Coverings for architectural structures or features such as architectural openings (e.g., windows), doors, archways, and the like (hereinafter "architectural structures" for the sake of convenience without intent to limit) come in many different forms and configurations. In addition to draperies, such architectural coverings, or "coverings" for the sake of non-limiting simplicity, can include blinds, shades, and the like. In some applications, the covering is retractable or extendable across the architectural structure to alter the amount of light passage and visibility across the covering. Different types of architectural coverings include, for instance, roller blinds and roller shades, pleated shades, roman shades, vertical blinds, shutters, and woven wood shades. Cellular shades are also very popular. A cellular shade includes multiple cells that trap air to increase the insulative factor of the covering. During retraction of the covering, the cells may collapse to decrease the volume of the cells, thereby providing a smaller panel to store. During extension of the covering, the cells may expand to not only trap air but also to provide an aesthetically pleasing look.

In some applications, it may be desirable to design the architectural covering to block or black out natural light. Such coverings, known as blackout or room darkening coverings (hereinafter "blackout coverings" for the sake of convenience and without intent to limit), can have various functions and purposes. For example, the blackout coverings can be installed in windows and doors of a bedroom in order to create an atmosphere conducive to sleeping by creating a dark environment even during daylight hours. Blackout coverings also provide UV protection. In essence, the blackout covering can function as a sunscreen for items contained within the room. Blocking out ultraviolet rays from the sun, for instance, can protect furniture, flooring and artwork from fading.

In some embodiments, blackout coverings can also absorb sound and reduce outside noise. The blackout covering, for instance, can improve a room's acoustics by reducing the intensity of outside sound. Blackout coverings can also significantly increase the insulative factor of the architectural covering. For instance, some blackout coverings are designed to reflect not only solar rays but also thermal energy emitted by the sun for preventing the interior of a building from undesirably increasing in temperature.

In the past, blackout materials for architectural coverings have been made using various different techniques and methods. In one embodiment, for instance, the blackout material may comprise a woven or nonwoven fabric that is coated with metallic particles. In general, however, these materials still often allow light transmission and can result in a lower optical density.

In other embodiments, blackout materials have been produced by vacuum depositing a metallic material on a film. Although metalized films are effective in blocking and reflecting sunlight and heat, the metalized film has been found generally not to be highly durable once installed in an architectural structure. Chemical and mechanical damage of metalized layers, for instance, can occur when the metalized layer is subjected to high heat and humidity conditions and/or where the metalized layer is frequently handled and manipulated. In addition, cleaning fluids, such as window cleaners, also have a tendency to degrade metalized layers. Once the metalized layer is degraded or damaged, not only is the optical density of the covering compromised, but the architectural covering can produce pinholes or other small scratches that allow for the passage of light and make the covering unattractive.

In the past, in order to protect the metalized layer, blackout materials have been produced that contain a significant amount of different layers that attempt to cover and protect the metalized layer. For instance, some past designs have included as many as nine or eleven layers of material. The construction of these multi-layer materials can be cost prohibitive.

In view of the above, an improved blackout material for architectural coverings is needed. In particular, a need exists for a durable blackout material that can be made efficiently.

SUMMARY

The present disclosure is generally directed to a light blocking material well suited to blocking electromagnetic radiation including solar energy. The light blocking material, for instance, can be used to block visible light, ultra violet radiation, and can also be used as a thermal barrier. The light blocking material can be used in numerous and diverse applications. In one embodiment, for instance, the light blocking material can be incorporated into a covering, such as a blind or a shade.

In one embodiment, the light blocking material includes at least one metalized layer, such as at least two metalized layers. Multiple metalized layers are used to ensure that the light blocking material maintains a relatively high optical density. For instance, damage to one of the metalized layers will impact the light blocking properties of the material if the second metalized layer is also damaged at the same location.

In order to protect the one or more metalized layers, at least one of the layers can be covered with a metal protective layer. The metal protective layer can be ultra-thin and can protect the metalized layer from scratches, pin holes, corrosion, and the like. The light blocking material also includes at least one finishing layer that forms an exterior surface of the light blocking material. The finishing layer, for instance, may comprise a fabric material and/or a sealant material that provides the light blocking material with a finished look.

In one embodiment, one of the metalized layers remains exposed and forms an exterior surface of the light blocking material. In this embodiment, the light blocking material can be incorporated into a cellular shade such that the exposed metal layer forms an inside surface of the individual cells. In this configuration, the exposed metal layer can dramatically increase the insulative properties of the cellular shade. In an alternative embodiment, the light blocking material can include a single metalized layer. The single metalized layer can be covered with a metal protective layer and also an additional heat seal layer. In one embodiment, the light blocking material can be incorporated into a covering, such as a blind or a shade, in between at least two layers of material for further providing protection to the metalized layer.

Other features and aspects of the present disclosure are discussed in greater detail below.

DEFINITIONS

Optical Density—Optical density can be used to determine the amount of light transmitted through a coated film or fabric. As used herein, optical density is measured using a XRITE densitometer. To measure the optical density of a metalized film, five specimens are obtained having dimensions of 2 inches by 2 inches. The densitometer is zeroed by depressing the snout down with no sample over the aperture. The button is depressed and the operator should verify that 0.00 appears in the display. Optical density readings are made by placing the sample over the aperture and depressing the snout (metal side up). Five optical density readings are taken using the specimens and the average is calculated. The machine is zeroed after every reading.

Durability Test For Blackout Material—The following procedure is designed to determine the efficiency and consistency of a blackout material, such as a double-metalized film made in accordance with the present disclosure.

Three material specimens or samples are obtained in the shape of a disk having a diameter of 2.75 inches. Each sample can be made from a metalized film. The center of each sample is marked with a 1 inch by 1 inch square using a marker. Each sample is placed in the XRITE densitometer using the procedure described above regarding optical density. An optical density measurement is taken for each specimen. For films only coated on one side, the metal side faces up. An average is calculated from the readings of the three specimens.

1 inch by 1 inch square samples of WHIPEALL or paper towel are contained and saturated with liquid DRANO manufactured by SC Johnson and Son Inc. The towel samples can be saturated with the liquid DRANO by placing the liquid DRANO in a petri dish and submerging the paper towel samples in the liquid composition.

Tongs are used to place one of the saturated paper towel squares on each of the metalized film samples. The saturated squares are placed on the marked center of each specimen. The saturated square is left on each specimen for 15 minutes. After 15 minutes, the square is removed and excess liquid is wiped off resulting in an etched area of the specimen.

The optical density of each specimen is then once again measured and the average of all three specimens is taken.

A pass/fail rating is determined by comparing the light transmittance to a standard of 2.25. Metalized films made according to the present disclosure can pass the above test.

BRIEF DESCRIPTION OF THE DRAWINGS

A full and enabling disclosure of the present disclosure is set forth more particularly in the remainder of the specification, including reference to the accompanying figures, in which.

DETAILED DESCRIPTION

Figure 1:
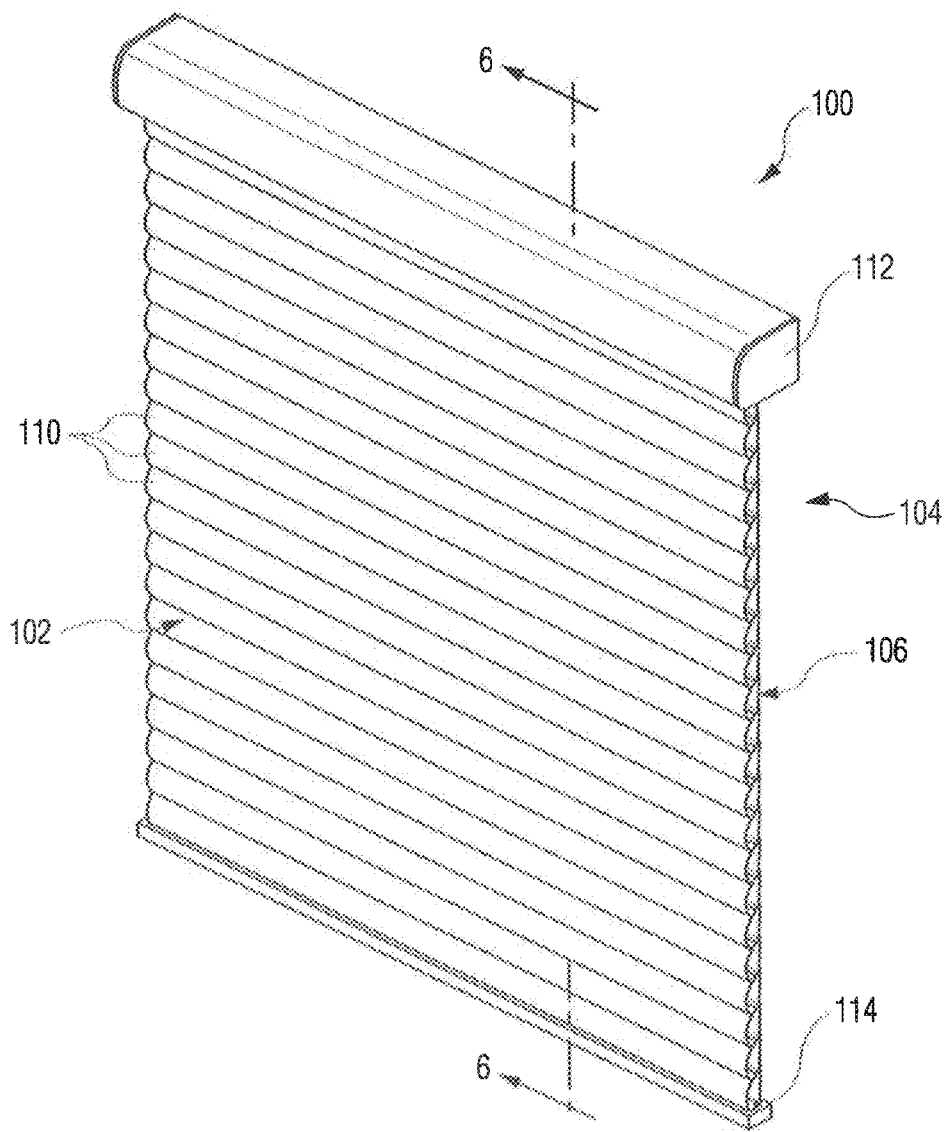
FIG. 1 is perspective view of one embodiment of an architectural covering made in accordance with the present disclosure.

It is to be understood by one of ordinary skill in the art that the present discussion is a description of exemplary embodiments only, and is not intended as limiting the broader aspects of the present disclosure.

In general, the present disclosure is directed to an improved composite blackout material well suited to blocking light and thermal energy, such as electromagnetic energy and radiation emitted by the sun. The composite blackout material of the present disclosure is well suited for use in an architectural covering or in any other suitable application where there is a desire to block sunlight or other radiation.

In general, the composite light blocking material of the present disclosure includes at least one metalized layer. For instance, in one embodiment, the light blocking material includes a single metalized layer that is protected by a metal protective layer and/or at least one finishing layer, that may comprise a sealant material. In an alternative embodiment, the composite light blocking material includes two separate metalized layers in combination with at least one exterior finishing layer. In addition, the blackout or light blocking composite material further includes at least one metal protective layer covering at least one of the metalized layers. The metal protective layer, which can be clear or colored, can be applied to the metalized layer in very low amounts and still provide protection to the metals from caustic or acidic substances, extreme environmental conditions, and/or from scratches or wear.

The light blocking material of the present disclosure provides various advantages and benefits. For example, the different layers present in the product are well suited for protecting the metalized film. Thus, the products have excellent and durable blackout qualities, even when containing only a single metal layer.

For products containing more than one metal layer, the different layers in the material can be altered and adjusted in order to optimize a particular application. For example, the optical density of each metalized layer can vary depending upon the desired result. In addition, the metal protective layer can be used to cover one of the metalized layers or it can be used to cover both of the metalized layers. In addition, the product can include a finishing layer that can vary depending upon the functional requirements and/or a desired aesthetic look. For instance, in one embodiment, the product can include a finishing layer that comprises a fabric material, such as a non-woven web. In this manner, the light blocking material can be soft to the touch and have an aesthetically pleasing appearance. Alternatively, the finishing layer can comprise a colorized seal layer that provides a more precise and finished look. In addition, the seal layer can display bright colors, such as a bright white color.

In addition to being easily modified or tailored to a particular application, the light blocking material of the present disclosure can also be efficiently and economically produced due to the elegant design of the product. For example, many of the layers that are incorporated into the light blocking material can be applied at high speeds. In addition, some of the layers are particularly formulated such that only small amounts of materials are required to produce a layer, which reduces material cost and allows the layers to be efficiently dried and cured. The light blocking material in addition to the film layer and the metalized layers, only contains an additional two to four layers to produce the product, which offers many advantages and benefits in relation to multilayer composites made in the past that were made with nine layers or even eleven layers.

The light blocking composite material of the present disclosure also displays excellent material properties and characteristics which facilitate use in an architectural covering. For instance, in one embodiment, by containing two separate metalized layers, the light blocking material is well suited to blocking and reflecting solar energy. Overall, the material can be made with an extremely high optical density. When installed in an architectural structure, for instance, the product not only blocks light but also protects a room interior from ultraviolet rays. For instance, the light blocking material is well suited to protecting furniture, flooring, and artwork from fading due to the harmful rays of ultraviolet light.

The light blocking material of the present disclosure can be made to be extremely durable. As described above, the different coatings can help protect a metalized layer, even when the product only contains a single metal layer. In one embodiment, by containing two separate metalized layers, the product is less susceptible to wear and damage. For example, metalized layers over time can degrade, especially in humid locations or when exposed to cleaning chemicals. In addition, metalized layers are susceptible to scratching or damage when handled. By containing two separate metalized layers, however, even if one of the layers is damaged in a certain location, the separate metalized layer remains protected against damage.

Having two separate metalized layers also allows for various architectural covering constructions and designs not possible in the past. For example, in one embodiment, the light blocking material can be designed so that one of the metalized layers remains exposed on an exterior surface of the product. When incorporated into an architectural covering, as will be described in greater detail below, the exposed metalized layer can offer many functional benefits and can dramatically increase the R factor of the architectural covering.

The light blocking material of the present disclosure can be incorporated into various different types of products. In general the light blocking material can be incorporated into any product where light blocking properties are desired. For instance, the light blocking material can be used in various different types of draperies or curtains. In addition, the light blocking material can be incorporated into dividers, panels, or other construction materials.

The light blocking material is particularly well suited for use in architectural coverings. The architectural covering, for instance, may comprise a blind or a shade. For instance, the light blocking material can be incorporated into a single panel roller blind or into multi-panel products. For instance, the light blocking material can be incorporated into a roman shade, a woven-wood product, or into a cellular shade.

Referring to FIG. 1, for instance, a cellular shade architectural covering 100 is shown that can include the light blocking material of the present disclosure. It should be understood that the product illustrated in FIG. 1 is for the purposes of illustration only and that the light blocking material of the present disclosure can be used in all different types of architectural coverings, such as all different types of honeycomb-style shades. As shown, the architectural covering 100 includes a retractable shade comprised of a facing layer 102 and a backing layer 104. The backing layer 104 is configured to face an architectural structure such as a window when installed. The facing layer 102 and the backing layer 104 cooperate to form a plurality of cells 106. In one embodiment, the facing layer and the backing layer can be made from continuous sheets of material. The layers can be attached to form the cells 106. Alternatively, the facing layer may be made from a plurality of individual strips 110 that are attached to the backing layer 104 made from a single sheet of material. In still another embodiment, each cell 106 can be made from multiple pieces of material and the individual cells can be attached together to form a vertical column.

In the embodiment illustrated in FIG. 1, the architectural covering 100 includes a head rail 112 and an end rail 114. The head rail 112 may include a mechanism capable of retracting and extending the shade.

In one embodiment of the present disclosure, the backing layer 104 can be made from the light blocking material of the present disclosure. In this manner, the backing layer 104 blocks solar energy while the facing layer 102 can be used to provide an aesthetically pleasing look. In addition, the individual cells 106 can provide thermal insulation and increase the R factor of the architectural covering which indicates an increase in thermal resistance.

Figure 2A:
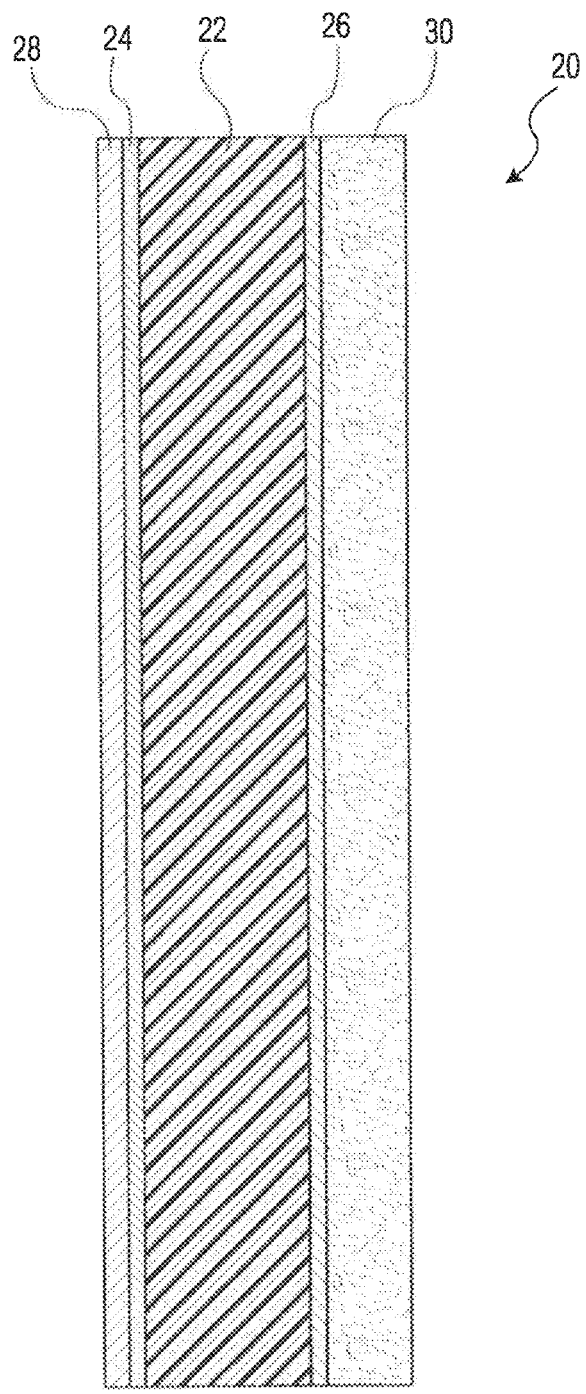
FIG. 2A is a cross-sectional view of one embodiment of a blackout material made in accordance with the present disclosure.

Referring to FIG. 2A, one embodiment of a light blocking material 20 made in accordance with the present disclosure is shown. In the embodiment illustrated in FIG. 2, the light blocking material 20 includes five different layers. In accordance with this embodiment of the present disclosure, the light blocking material 20 includes a polymer film 22 coated on one side with a first metalized layer 24 and coated on a second side with a second metalized layer 26. As described above, the use of two metalized layers 24 and 26 has been found to provide better blackout properties and has been found to be dramatically more durable than blackout materials used in the past containing only a single metalized layer.

In general, the polymer film 22 can be made from any suitable polymer material capable of being adhered to a metalized layer. The polymer film 22, for instance, can be made from a polyester polymer, a polyolefin polymer such as polyethylene or polypropylene, a polyvinyl chloride polymer, copolymers thereof and the like. In one embodiment, for instance, the polymer film 22 comprises a polyester film. The polyester film, for instance, may comprise polyethylene terephthalate.

In one embodiment, for instance, the polymer film can be formed from a polyester resin that is melted and blown or extruded as an amorphous sheet onto a polished revolving casting drum to form a cast sheet of the polymer. Thereafter, the film can optionally be stretched in one direction or in two directions. For example, in one embodiment, the film is biaxially oriented, meaning that the film is stretched in both the longitudinal direction and the transverse direction while still in a softened state. For example, the film can be stretched in the longitudinal direction in an amount of generally greater than about 2 times, such as greater than about 4 times, and generally less than about 6 times, such as less than about 5 times. The above lower and upper limits can also change in increments of plus or minus 0.5 times. Similarly, the film can be stretched in the transverse direction at a draw ratio of greater than about 1.5, such as greater than about 2, and generally at a draw ratio of less than about 5, such as less than about 4.5. The upper and lower limits of the above draw ratios can change in increments of plus or minus 0.5 times.

After stretching, the film can also optionally be heat treated. Heat treating the film can crystallize the polyester film and impart stability and increase tensile properties.

The thickness of the polymer film 22 can vary depending upon the particular application. For instance, the film can have a thickness of less than about 50 microns, such as less than about 40 microns, such as less than about 30 microns, such as less than about 20 microns, such as even less than about 15 microns. The thickness of the film can decrease from any of the above values at increments of 5 microns. The thickness of the film is generally greater than about 5 microns, such as greater than 8 microns, such as greater than 10 microns. The thickness of the film can increase from any of the above values in increments of 2 microns.

If desired, filler particles may be added to the polymer film 22. Because the polymer film 22 is coated on each side with the metalized layers 22 and 26, however, in one embodiment, the polymer film 22 may comprise a clear or transparent film. For example, by coating the film on both sides with metal layers, it is unnecessary to whiten or colorize the film for aesthetic purposes. Thus, white filler such as calcium carbonate, titanium oxide, or barium sulfate need not be added to the film 22, which not only represents cost savings but also simplifies the process for making the film.

Once the polymer film 22 is formed, metalized layers 24 and 26 are applied to opposite sides of the film. The metalized layers 24 and 26 may comprise a metal or a metal oxide. For instance, the metalized layers may comprise aluminum, copper, iron, silver, gold, chromium, nickel, zinc, and the like including oxides thereof and alloys thereof. For instance, in one embodiment, the metalized layers may comprise a chromium alloy or an aluminum alloy containing copper, magnesium, or other metals.

The metalized layers 24 and 26 can be formed on the polymer film 22 using various different techniques and methods. For example, the metallic layers can be electroplated or printed on the polymer film. In one embodiment for instance, the metalized layers 24 and 26 are vacuum deposited onto each surface of the polymer film 22.

In a vacuum deposition process, a stream of metal vapor or atoms is deposited onto the film by vacuum deposition. This is accomplished by heating the metal particles in a high vacuum such as at a pressure of from about $10^{-3}$ to about $10^{-5}$ torr at a temperature above the melting point of the metal such that the vapor pressure of the metal exceeds about $10^{-2}$ torr or is effective by subjecting the metal to a stream of bombarding ions whereby the metal or metal oxide is removed by sputtering.

When the above conditions are met, the metal or metal oxide is vaporized or sputtered forming a metal vapor. The metal vapor impinges on the film surface, condenses, and forms a thin metallic coating on the film.

The thickness of the metalized layers 24 and 26 can vary depending upon the manner in which the metal or metal oxide is applied to the film and the desired result. When producing vacuum deposited films, very thin films with good uniform properties can be created. For instance, the films can have a thickness of less than about 3000 angstroms, such as less than about 2000 angstroms, such as less than about 1000 angstroms, such as less than about 800 angstroms, such as less than about 600 angstroms, such as less than about 400 angstroms, such as less than about 200 angstroms, such as even less than about 100 angstroms. The thickness of the film, for instance, can be less than about 3000 angstroms to less than about 100 angstroms and can include any increment of 100 angstroms therebetween. The metalized layer generally has a thickness of greater than about 10 angstroms, such as greater than about 50 angstroms, such as greater than about 100 angstroms, such as greater than about 200 angstroms, such as greater than about 300 angstroms. The metalized layer, for instance, can have a thickness of greater than about 10 angstroms to greater than about 300 angstroms and can include any increment of 10 angstroms therebetween.

The metalized layers 24 and 26 can have the same properties and characteristics or can be formed so as to have different properties and characteristics. For instance, the metalized layer can be made from different metals and/or can have different thicknesses. In one embodiment, the metalized layers are formed with a different optical density. Optical density is a numeric calculation that compares the amount of light transmitted through an area of the film to the amount of light originally striking or incident on the film. Optical density can be measured by the logarithmic value of light transmittance. As the percentage of light transmitted decreases, the optical density increases. Optical densities can generally vary from 0.0 to 5.0.

In one embodiment, the light blocking material 20 is constructed such that the first metalized layer 24 has a higher optical density than the second metalized layer 26. For example, the first metalized layer 24 can generally have an optical density of greater than about 2, such as greater than about 2.2, such as greater than about 2.4. The optical density of the first metalized layer 24 is generally less than about 4.0, such as less than about 3.5, such as less than about 3. The optical density of the second metalized layer 26, on the other hand, can be less than 2, such as less than about 1.8, such as less than about 1.6. The optical density of the second metalized layer 26 can generally be greater than about 0.5, such as greater than about 0.8, such as greater than about 1, such as greater than about 1.2, such as greater than about 1.4. In one embodiment, for instance, the first metalized layer 24 can have an optical density of from about 2.4 to about 4.0 and the second metalized layer 26 can have an optical density of from about 1.2 to about 2.2.

There are various advantages and benefits to designing the light blocking material 20 such that the first metalized layer 24 has a higher optical density than the second metalized layer 26. For instance, the metalized layers at the above optical densities are well suited to working in conjunction to block light an optimum amount, even if one of the metalized layers is damaged. In addition, varying the optical density on each side of the film produces a film with excellent physical properties. For instance, varying the optical density can prevent distortions and wrinkles in the film. Varying the optical density of each side can also prevent a phenomenon known as "tin canning" which refers to the formation of parallel streaks across the surface of the film.

In other embodiments, however, the optical density of the first metalized layer 24 and the second metalized layer 26 can be generally about the same (within 10% of each other). For example, in one embodiment, the optical density of the first metalized layer 24 and the second metalized layer 26 range from about 2.5 to about 3.5, such as from about 2.8 to about 3.2.

In accordance with the present disclosure, at least one of the metalized layers is covered with a metal protective layer. The metal protective layer, for instance, can be coated on both the first metalized layer 24 and the second metalized layer 26. In the embodiment illustrated in FIG. 2, only a single metal protective layer 28 is shown covering the first metalized layer 24. In general, the metal protective layer 28 is used to coat the metalized layer with the highest optical density.

In accordance with the present disclosure, the metal protective layer is designed to protect the metalized layer 24 from damage or degradation. For instance, the metal protective layer comprises a cross-linked film that provides a hard protective covering. For instance, in one embodiment, the film can comprise a thermoset polymer. In addition to forming a hard surface, the metal protective layer is also thin thus remaining flexible. Finally, the metal protective layer is also heat resistant.

In one embodiment, the metal protective layer 28 is formulated so that it can be applied to the metalized layer 24 by using high speed printing techniques and can form an effective protective barrier at extremely small thicknesses. For example, in one embodiment, the metal protective layer can have a basis weight of less than about 10 gsm, such as less than about 8 gsm, such as less than about 5 gsm, such as less than about 4 gsm, such as less than about 3 gsm. The basis weight, for instance, can generally range from about 10 gsm to about 0.5 gsm and can include any increment of about 0.5 gsm therebetween. The basis weight is generally greater than about 0.5 gsm.

In one embodiment, the metal protective layer is formed from a solvent-based polymer system. The polymer, for instance, may comprise a curable polymer. For instance, in one embodiment, the metal protective layer contains an acrylic polymer including acrylic-based polymers, a urethane polymer, or mixtures thereof. The metal protective layer can be applied to the metalized layer 24, in one embodiment, using a printing device, such as a gravure printer. Once applied to the metalized layer 24, the metal protective composition is dried and cured to form the metal protective layer 28. In one embodiment, the metal protective layer is applied directly to and adhered to the first metalized layer without any intervening layers.

The metal protective layer 28 can be formulated to be clear and transparent, translucent, or opaque. In one embodiment, for instance, the metal protective layer can include a pigment such that the layer is opaque and colorized. In one embodiment, for instance, the metal protective layer 28 can display a white color and can contain pigment filler such as titanium dioxide, zinc sulfide, barium sulfate, calcium carbonate, kaolin, or the like. A pigment or coloring agent can be added to the metal protective layer 28, for instance, in order to improve the aesthetic qualities of the product.

The light blocking material 20 as shown in FIG. 2A further includes a layer 30 that can comprise a finishing layer that is intended to form an exterior surface of the product. The finishing layer can vary depending upon the particular application and can comprise any functional or aesthetic layer capable of forming a suitable exterior surface. For instance, the functional or aesthetic layer may comprise a fabric such as a woven, nonwoven or knit fabric, may comprise a film layer, may comprise a perforated film, may comprise a mesh or scrim layer, or the like. In the embodiment illustrated in FIG. 2A, the exterior surface of the finishing layer 30 is designed to be adjacent an architectural feature such as a window. The metal protective layer 28, on the other hand, is designed to face the interior of a room.

In one embodiment, the layer 30 can comprise a colored polymer sealant layer. For instance, the sealant layer 30 can comprise a polymer coating that provides the light blocking material 20 with a finished and refined look.

In one embodiment, the polymer sealant layer 30 is made from a polymer that can be applied to the metalized layer 26 at a relatively low application temperature in order to improve process efficiency. For instance, the polymer sealant layer 30 can be made from a polymer having a melting temperature of less than about 170° C., such as less than about 150° C., such as less than about 140° C. The melting temperature is generally greater than about 80° C., such as greater than about 110° C. The melting temperature of the polymer sealant layer, for instance, can be anywhere from about 100° C. to about 180° C. including any 5° C. increment therebetween. In one embodiment, for instance, the polymer sealant layer 30 is comprised of one or more polyolefin polymers, including copolymers and terpolymers. For instance, in one embodiment, the polymer sealant layer contains a polypropylene polymer and/or a polyethylene polymer. The polymer sealant layer 30, for instance, may comprise a polyethylene copolymer or polypropylene copolymer, such as a polyethylene naphthalate. The above polymer can be applied to the second metalized layer 26 using any suitable coating technique, such as roll coating, reverse roll coating, gravure roll coating, reverse gravure roll coating, brush coating, Meyer rod coating, knife coating, or the like.

The polymer used to form the polymer sealant layer 30 may naturally display a color, such as white. Alternatively, the polymer sealant layer 30 may contain one or more pigments. For instance, in order to have a white color, the polymer sealant layer may contain pigment filler. In order to produce a bright white appearance, for instance, the polymer sealant layer 30 may contain filler particles comprised of titanium dioxide, barium sulfate, calcium carbonate, or the like. In addition to producing a bright white appearance, various other coloring agents can be added to the sealant layer 30 in order to produce a desired aesthetic affect.

Of particular advantage, when the layer 30 comprises a polymer sealant layer as described above, the polymer sealant layer may be used as an exterior surface of the product or can be used to attach the light blocking material 20 to further layers thus becoming an intermediate attachment layer. For example, the polymer sealant layer 30 can be from a thermoplastic polymer having a relatively low melting temperature that allows for the lamination of the light blocking material 20 to other exterior layers, such as a fabric layer as will be explained with reference to FIGS. 7 and 8.

In the embodiment illustrated in FIG. 2A, the light blocking material 20 only includes a single finishing layer 30. In other embodiments, however, the light blocking material may include two finishing layers that form both exterior surfaces of the composite product.

Figure 2B:
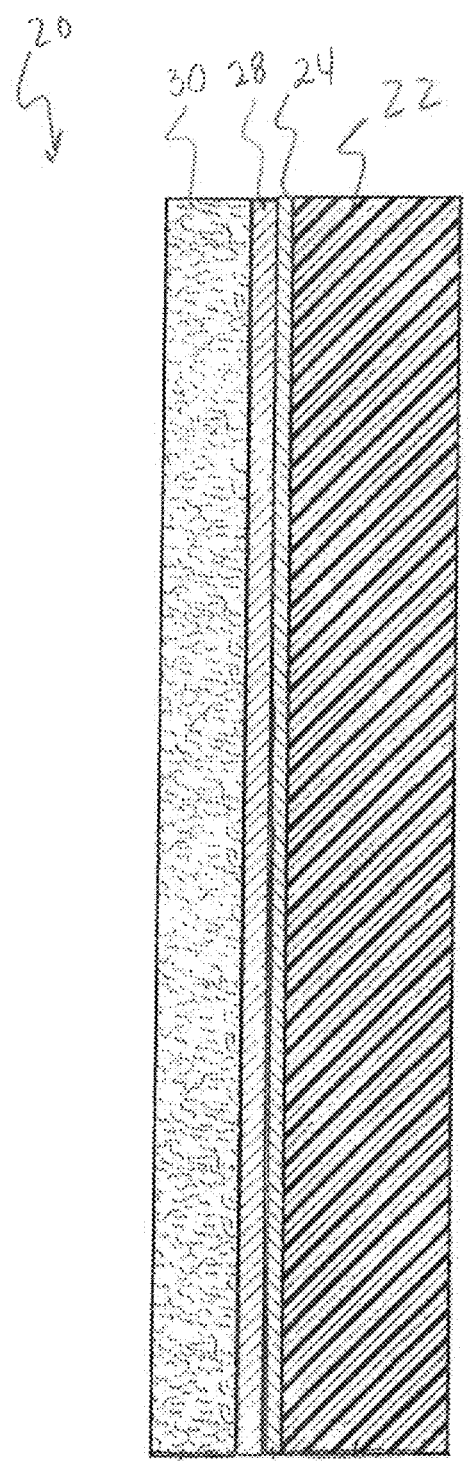
FIG. 2B is a cross-sectional view of another embodiment of a blackout material made in accordance with the present disclosure.
Figure 8:
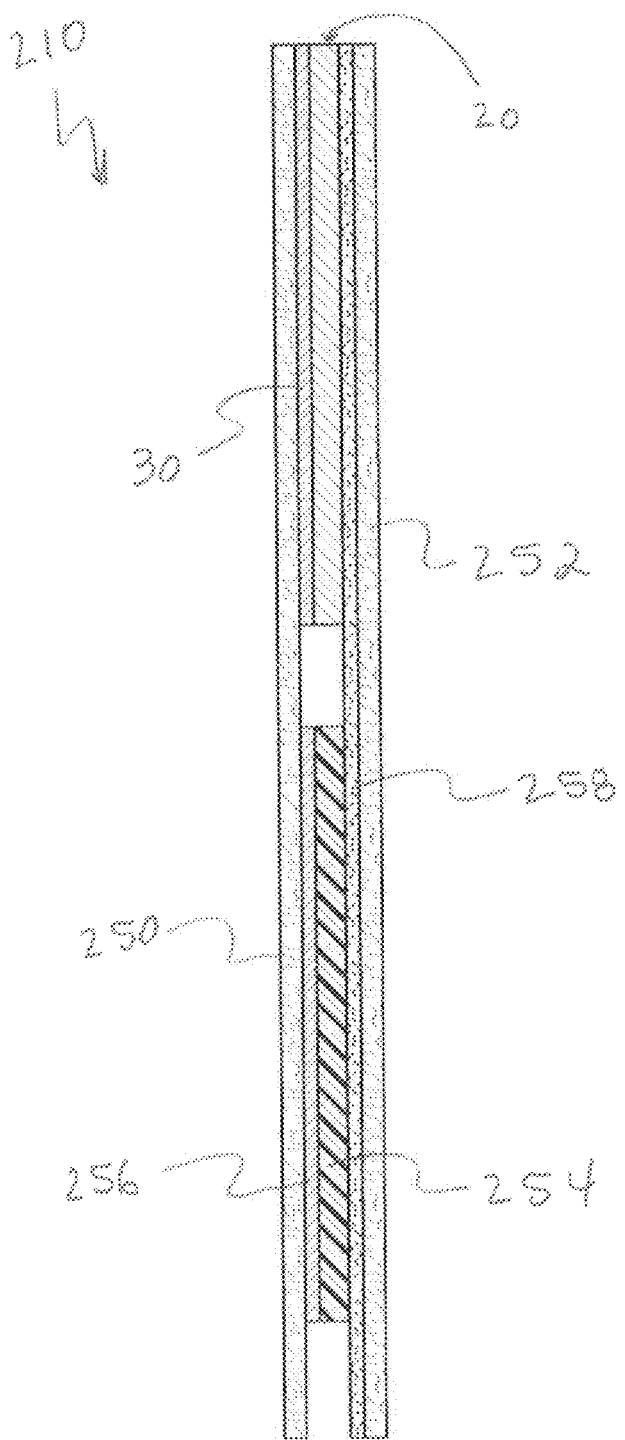
FIG. 8 is a cross-sectional view of one embodiment of a fabric laminate that may be used to construct an architectural covering in accordance with the present disclosure including a blackout material; and Repeat use of reference characters in the present specification and drawings is intended to represent the same or analogous features or elements of the present invention.

Referring to FIG. 2B, another embodiment of a light blocking material 20 made in accordance with the present disclosure is shown. Like reference numerals have been used to show similar elements. The light blocking material 20 as shown in FIG. 2B includes only a single metalized layer 24 disposed on one side of the polymer film 22. As shown, the metalized layer 24 is covered by a metal protective layer 28 which is coextensive with the metalized layer 24. The metal protective layer 28 is in turn covered by a finishing layer 30 which may comprise a colored polymer sealant layer as described above. The metal protective layer 28 and the sealant layer 30 protect the metal layer 24 during use of the composite film product. The polymer film 22, the metalized layer 24, the metal protective layer 28, and the finishing layer 30 can be constructed as described above with respect to FIG. 2A. The light blocking material 20 as shown in FIG. 2B containing only a single metalized layer 24 is particularly well suited to being incorporated into an architectural covering as shown in FIG. 8 and as will be described in greater detail below.

Figure 3:
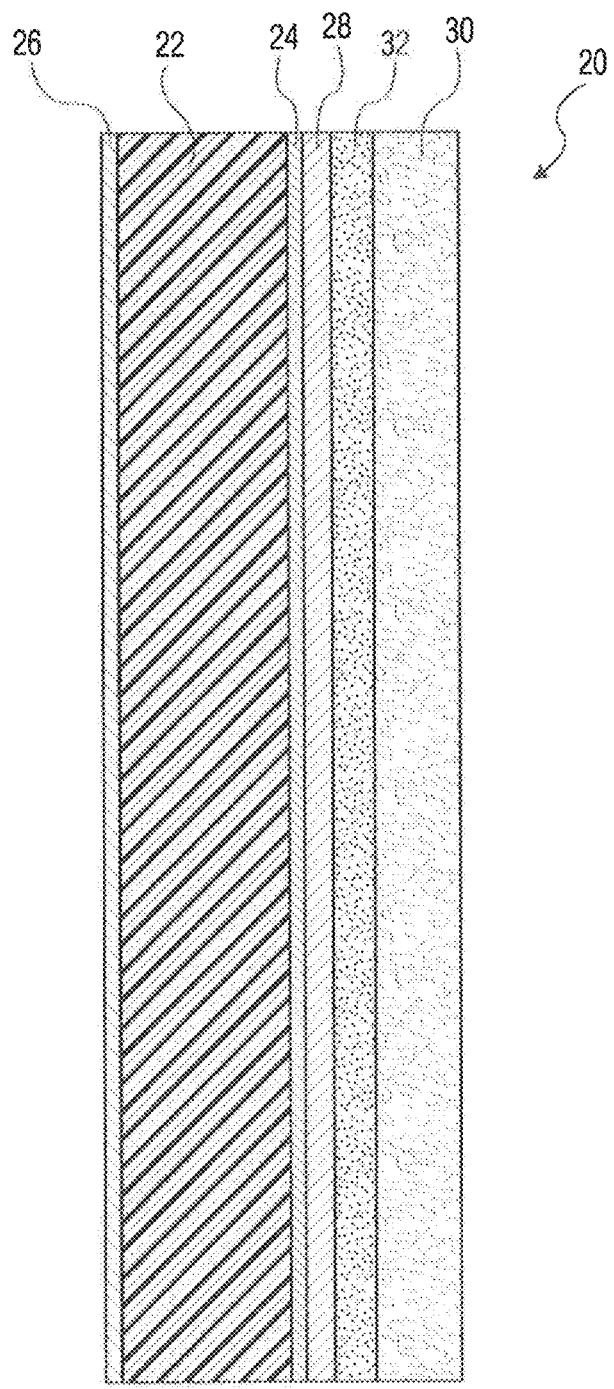
FIG. 3 is a cross-sectional view of another embodiment of a blackout material made in accordance with the present disclosure.

Referring to FIG. 3, another embodiment of a light blocking material 20 made in accordance with the present disclosure is shown. Like reference numerals have been used to show similar elements.

Similar to the light blocking material shown in FIG. 2A, the light blocking material 20 in FIG. 3 includes a polymer film 22 coated on opposite sides with a first metalized layer 24 and a second metalized layer 26. In addition, the first metalized layer 24 is coated with a metal protective layer 28 as described above. The light blocking material 20 as shown in FIG. 3 further includes a finishing layer 30 that defines an exterior surface of the product.

In FIG. 3, the finishing layer 30 comprises a fabric material. The fabric material 30 is designed to face an architectural feature such as a window in an architectural structure opposite the interior of the room. In general, any suitable fabric material may be used to construct the finishing layer 30. The fabric material 30 can display a single color or can display a pattern of multiple colors. The fabric material 30 can comprise generally a knitted fabric, a woven fabric, or a nonwoven fabric. In one embodiment, for instance, the fabric material 30 comprises a nonwoven web made from synthetic polymer fibers. For example, the nonwoven web may comprise a spunbond web, a hydroentangled webs, a meltblown web, a bonded carded web, or the like. When using hydroentangled webs, the substrate used to form the hydroentangled web may comprise a spunbond web or a carded web. Bonded carded webs include webs that have been point bonded together or webs that have been area bonded together. The nonwoven web can be made from various different types of polymer fibers (as used herein, fibers include filaments). For instance, the fibers can be made from a polyolefin polymer such as polypropylene or from a polyester polymer.

In one embodiment, the fabric material 30 can comprise a nonwoven web including high melt fibers and low melt fibers. The low melt fibers, for instance, can melt at a temperature of less than about 360° F., such as less than about 340° F., such as less than about 320° F. The low melt fibers may be used in order to bond the fabric material to the other layers that make up the light blocking material.

Alternatively, as shown in FIG. 3, an adhesive layer 32 may be used to bond the fabric material 30 to the metal protective layer 28. In one embodiment, for instance, the adhesive layer 32 may comprise a hot melt adhesive. The hot melt adhesive, for instance, can comprise a high temperature polymer. For instance, the polymer contained within the hot melt adhesive may have a melting point of greater than about 180° C., such as greater than about 190° C., such as greater than about 200° C. In general, the polymer can have a melt point of anywhere between about 180° C. and 400° C. including any 5° C. increment therebetween.

A hot melt adhesive is generally a thermoplastic polymer based adhesive which is applied in the molten state and which functions primarily by mechanical attachment. The hot melt adhesive can be applied to the metallic protective layer 28 using any suitable method or technique in order to attach the fabric material 30. For instance, the hot melt adhesive can be applied using a nozzle, a slot die, by extrusion, by depositing meltblown fibers on the substrate, by air knife coating, or by Meyer rod coating.

In one embodiment, the adhesive layer 32 comprises a polyester polymer that is applied using direct gravure printing or using a knife coating technique. In one embodiment, the polyester may comprise copolyester and may be formulated so that minimal amounts of the polymer are needed to attach the fabric material. For instance, in one embodiment, the basis weight of the adhesive layer 32 may be less than about 20 gsm, such as less than about 15 gsm, such as less than about 12 gsm. The adhesive layer generally has a basis weight of greater than about 2 gsm, such as greater than about 4 gsm. In general, the adhesive layer can have a basis weight of anywhere of from about 20 gsm to about 1 gsm including any increment of 1 gsm therebetween.

In the embodiment illustrated in FIG. 3, the light blocking material 20 includes a single finishing layer 30 on one side of the composite product that is intended to face architectural features such as a window. In an alternative embodiment, an additional finishing layer can be applied to the opposite side of the light blocking material in order to cover the second metalized layer 26. The second metalized layer 26 may also be coated with a metal protective layer alone or in combination with a later finishing layer. The finishing layer may comprise the fabric material 30 as shown in FIG. 3 or can comprise any suitable layer, such as a polymer sealant as shown in FIG. 2A.

In the particular embodiment illustrated in FIG. 3, the second metalized layer 26 is shown exposed forming an exterior surface of the light blocking material 20. The light blocking material 20 as shown in FIG. 3 is intended for use in an architectural covering where the second metalized layer 26 faces another panel or layer of material in the architectural covering. In one embodiment, for instance, the light blocking material 20 can be incorporated into a cellular shade such as shown in FIG. 1. In this manner, the exposed metalized layer 26 forms an inner surface of each of the cells 106. In this manner, the metalized layer 26 is somewhat protected within the product. If left exposed within the individual cells 106, the metalized layer 26 can dramatically increase the insulative properties of the architectural covering 100. For instance, the exposed metalized layer 26 may dramatically improve the R value of the product.

As described above, the architectural covering 100 as shown in FIG. 1 can be assembled using various techniques and configurations in order to incorporate the light blocking material of the present disclosure into the product. In one embodiment, for instance, the backing layer 104 is made from a continuous sheet of the light blocking material. In an alternative embodiment, however, each of the cells 106 can be made from multiple pieces of material including a piece of the light blocking material.

Figure 4:
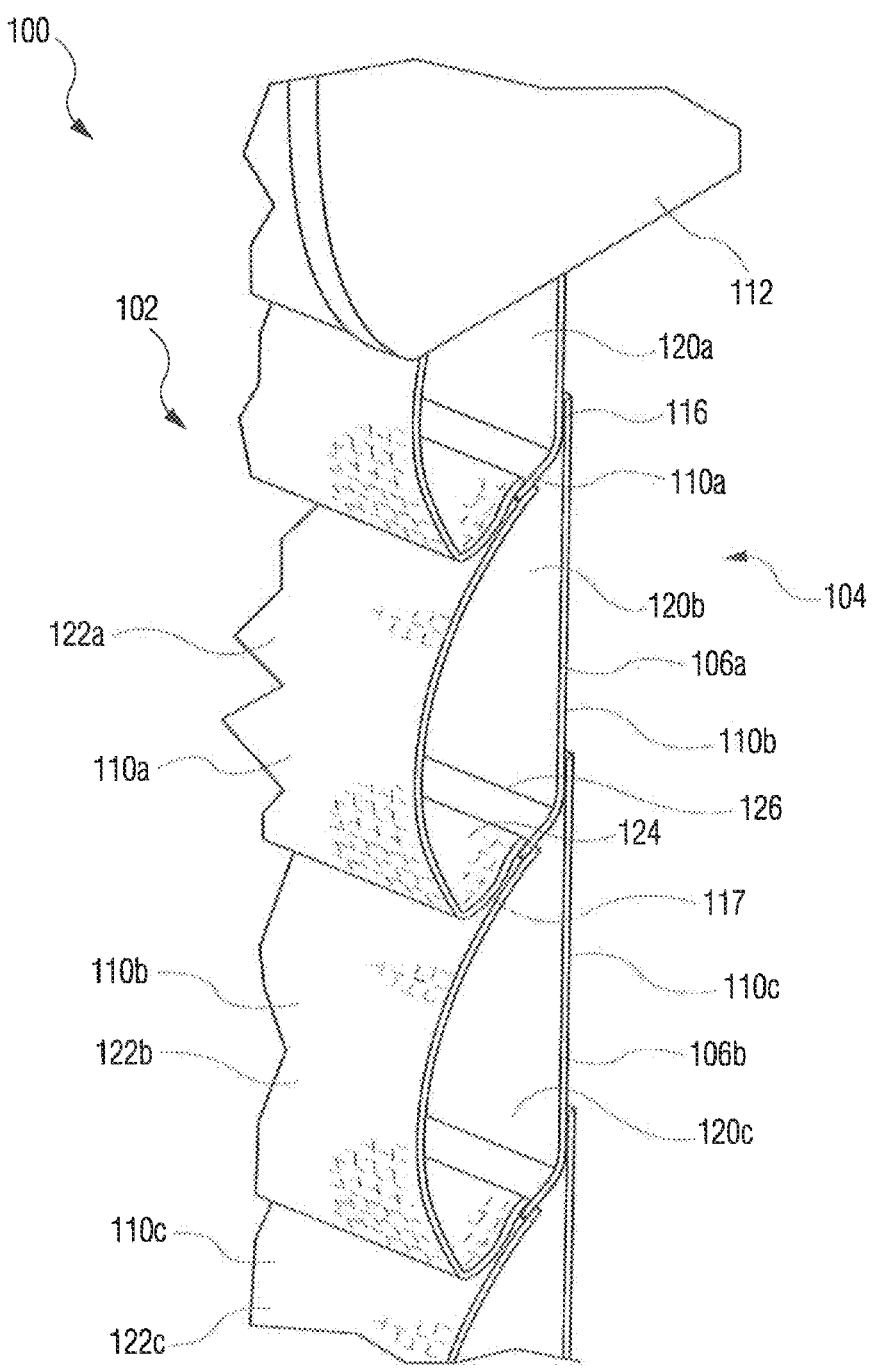
FIG. 4 is a perspective view showing a portion of an embodiment of an architectural covering made in accordance with the present disclosure.
Figure 5:
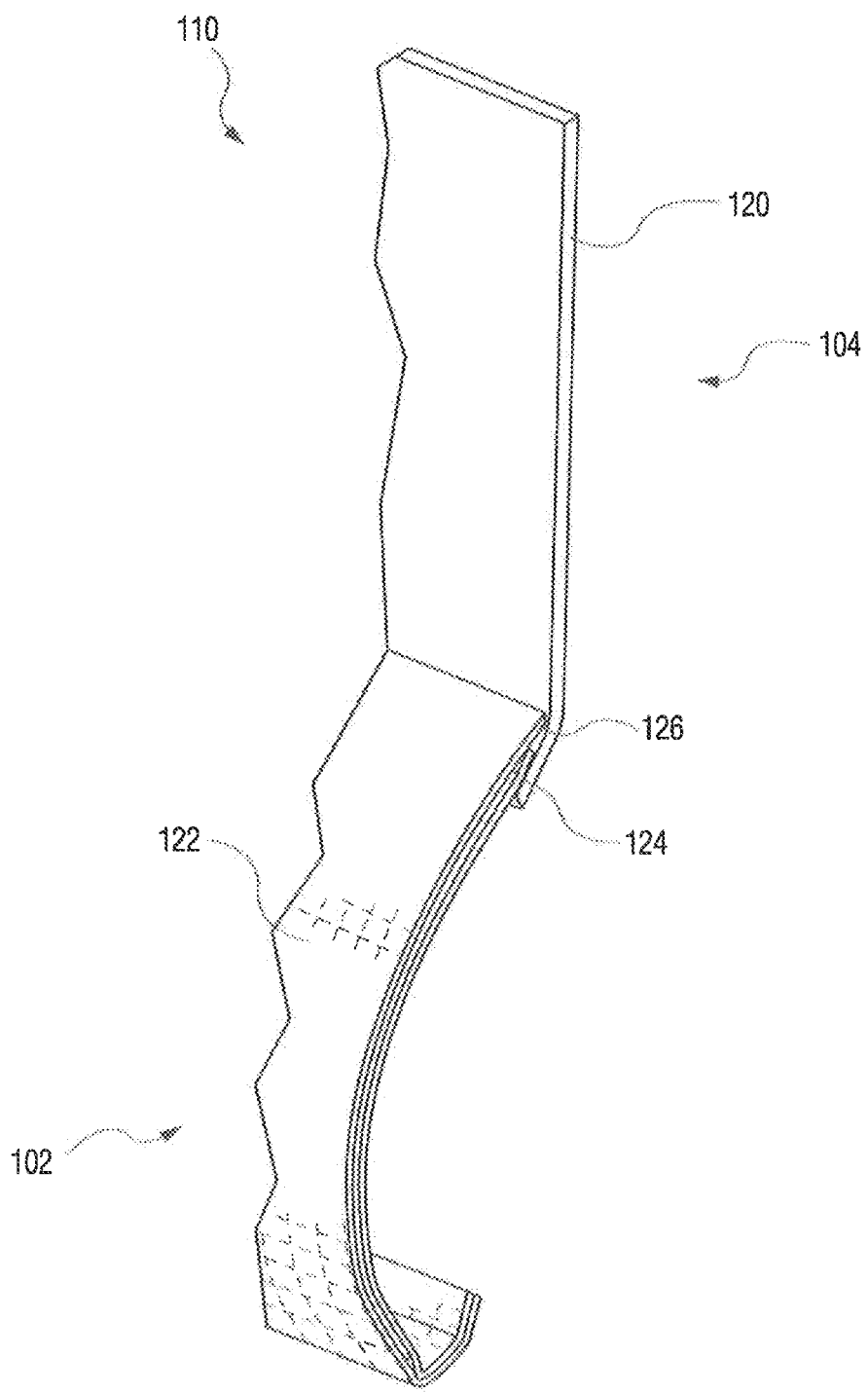
FIG. 5 is a perspective view showing a portion of one embodiment of a panel that may be used to construct the architectural covering illustrated in FIG. 1 showing a blackout material made in accordance with the present disclosure attached to an adjoining piece of material.
Figure 6:
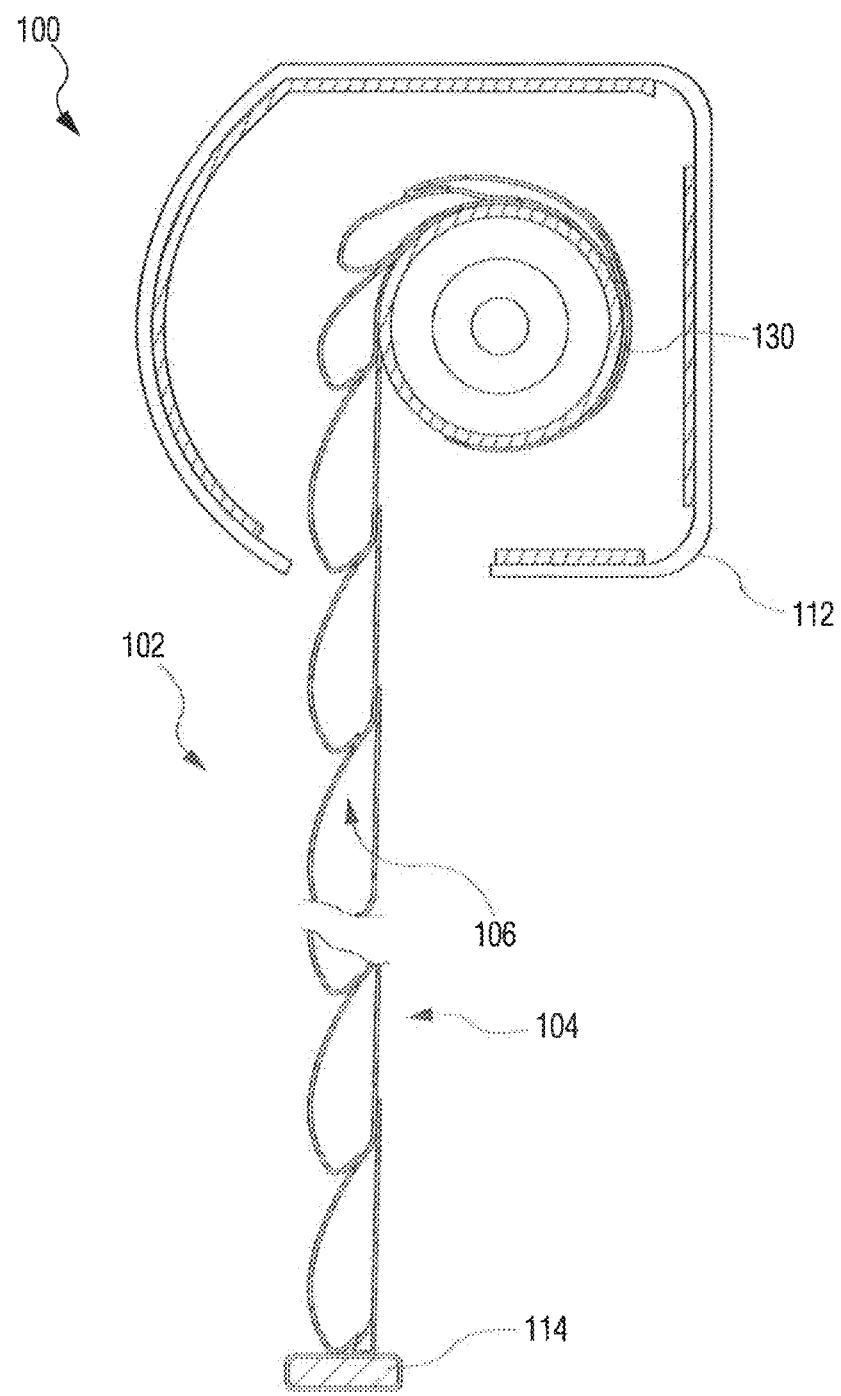
FIG. 6 is a cross-sectional view of an architectural covering made in accordance with the present disclosure.

For instance, referring to FIGS. 4-6, different configurations for forming the architectural covering 100 are shown.

Referring to FIG. 4, for instance, the architectural covering 100 includes cells 106a and 106b wherein each cell is made from two cooperating strips of material. In FIG. 4, for instance, the architectural covering 100 includes strips of material 110*a*, 110*b*, and 110*c*. Strips of material 110*a* and 110*b*, for instance, cooperate together to form cell 106*a*. Strips of material 110*b* and 110*c*, on the other hand, cooperate together to form cell 106*b*.

More particularly, strip of material 110*a* forms the facing layer of cell 106*a*, while the strip of material 110*b* primarily forms the backing layer 104 of the cell 106*a*. As shown in FIG. 4, strip of material 110*a* is attached to strip of material 110*b* at a first attachment point 116 and at a second attachment point 117.

Referring to FIG. 5, an isolated strip of material 110 is illustrated. As shown, strip of material 110 is made from a plurality of segments or pieces of material. More particularly, in the embodiment illustrated in FIG. 5, the strip of material 110 includes a light blocking segment 120 and a facing segment 122. The light blocking segment 120 is attached to the facing segment 122 at an attachment point 124 adjacent to a fold line 126 formed into the light blocking segment 120. As shown in FIG. 4, for instance, strip of material 110*a* includes light blocking segment 120*a* and facing segment 122*a*. Strip of material 110*b*, includes light blocking segment 120*b* and facing segment 122*b*, while strip of material 110*c* includes light blocking segment 120*c* and facing segment 122*c*. In FIG. 5, the facing segment 122 overlaps and is on top of the light blocking segment 120 at attachment point 124. In FIG. 4, the light blocking segment 120 overlaps and is on top of the facing segment 122 at the attachment point.

As shown in FIGS. 4 and 5, the light blocking segment 120 not only forms the backing layer of each cell but also overlaps with the facing layer of each cell past the crease or fold line 126. By extending past the connection point with the facing segment that forms the facing layer, the light blocking segment 120 blocks out light that may attempt to filter through the architectural covering. The overlap portion, for instance, prevents the formation of any light gaps.

Referring to FIG. 6, a cross section of architectural covering 110 is illustrated. The operating mechanism of the covering 110 is illustrated. As shown, contained within the head rail 112 is a roller 130. The roller 130 is for retracting and extending the covering or shade across the architectural structure. The end rail 114 may be attached to the covering opposite the roller 130 and the weight of the end rail 114 may tension the covering when extended to help expand the cells 106 from a collapsed configuration to an expanded configuration.

As shown, the covering or panel comprised of the facing layer 102 and the backing layer 104 may be wound around the roller 130. As the panel is wound around the roller 130, the effective length of the panel decreases and the bottom rail 114 is moved towards the head rail 112. The head rail 112 may be dimensioned to house or receive the entire panel wound around the roller 130 so that the panel is hidden from view. The bottom rail 114 may be received through an opening in an underside of the head rail 112, or may abut against the underside of the head rail 112.

Of particular advantage, the light blocking material of the present disclosure can be incorporated into the architectural covering as shown in FIG. 6 and is sufficiently flexible to allow the cells 106 to collapse when wound around the roller 130 and then to expand when the panel is released from the roller 130.

In the embodiments described above, especially with reference to FIGS. 4 and 5, the light blocking materials shown in FIGS. 2A, 2B, and 3 can be directly incorporated into a covering for an architectural opening in a manner such that the light blocking material forms an exterior surface on the product. It should be understood, however, that the light blocking materials as shown in FIGS. 2A, 2B and 3 can also be used as an insert material in an architectural covering. For instance, in one embodiment, the light blocking material of the present disclosure can be integrated into an architectural covering such that the light blocking material does not form an exterior surface of the covering. For example, in one particular embodiment, the light blocking material can be sandwiched in between two opposing fabrics at desired locations as will be described in greater detail below with reference to FIGS. 7 and 8.

Figure 7:
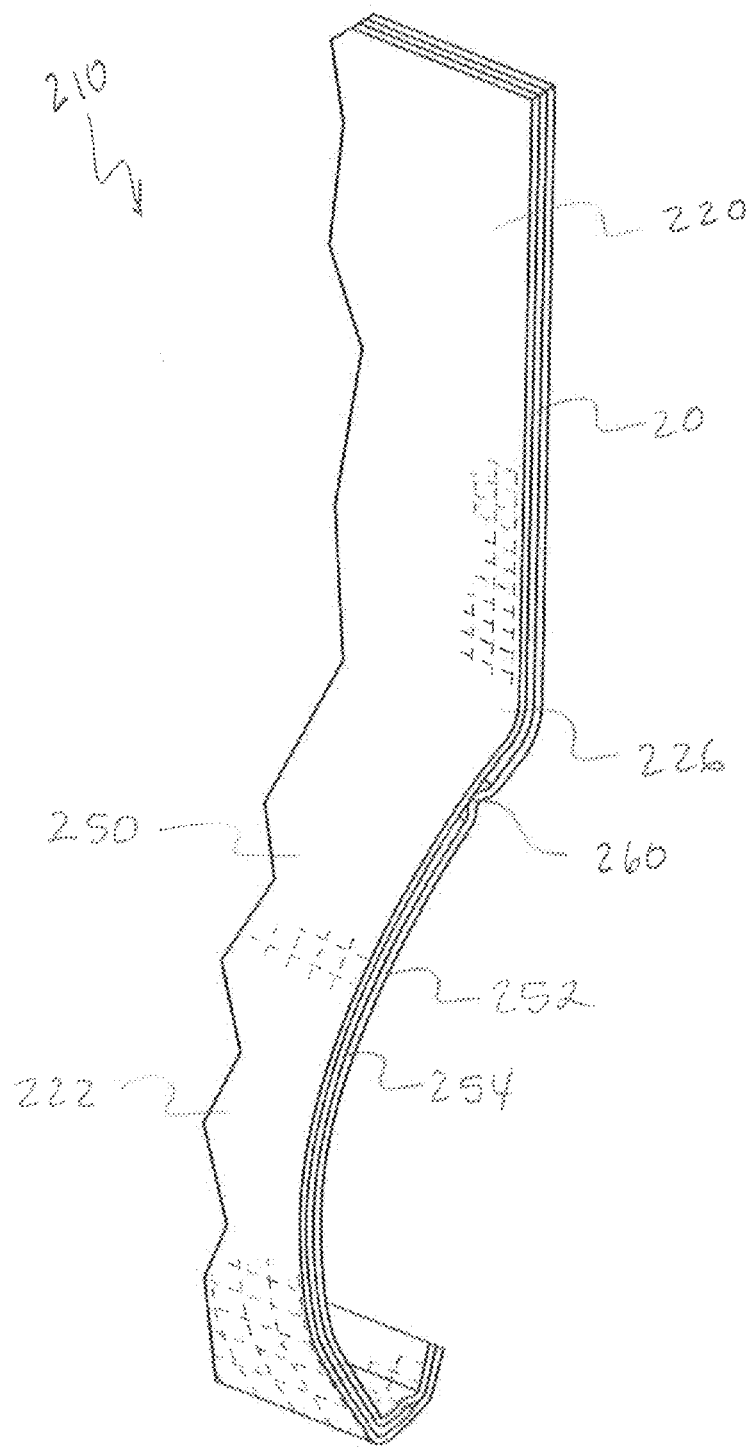
FIG. 7 is a perspective view showing a portion of another embodiment of a panel that may be used to construct the architectural covering illustrated in FIG. 1 made from the fabric composite illustrated in FIG. 8.

Referring to FIGS. 7 and 8, a further embodiment of a strip of material 210 that may be used to form the window covering 100 as shown in FIG. 1 is illustrated. FIG. 8, for instance, illustrates a cross-section of a fabric composite that can be used to produce the strip 210 as shown in FIG. 7.

Referring to FIG. 8, for instance, the fabric composite 210 includes a first exterior layer 250 opposite a second exterior layer 252. The exterior layers 250 and 252 may comprise any suitable functional or aesthetic layer, such as a fabric. For instance, the exterior layers 250 and 252 may comprise nonwoven materials (including nonwoven laminates), knitted materials, woven materials, and the like. Further, the exterior layer 250 can be the same or different than the exterior layer 252. Positioned between the exterior layers 250 and 252 is a light blocking material 20 spaced from an insert layer 254. The light blocking material 20, in one embodiment, may comprise one of the light blocking materials illustrated in FIG. 2A or 2B. Alternatively, the light blocking material 20 may include the light blocking material illustrated in FIG. 3 or may comprise any of the other light blocking embodiments described above.

The insert layer 254, on the other hand, can comprise, in one embodiment, a transparent or translucent film. For instance, in one embodiment, the insert layer 254 comprises a transparent or translucent polyester film or other polymer film.

As shown in FIG. 8, the light blocking material 20 includes a layer 30 which may comprise a polymer sealant layer as described above. In addition, the insert layer 254 can include a polymer sealant layer 256. As described above, the polymer sealant layers 30 and 256 can be made from a thermoplastic polymer having a relatively low melting temperature. In this manner, the polymer sealant layers 30 and 256 can be used to laminate the light blocking material 20 and the insert material 254 to the exterior layer 250.

For example, in one embodiment, continuous strips of the light blocking material 20 and the insert material 254 can be fed into a laminator simultaneously with a continuous roll of material comprising the exterior layer 250. Heat and pressure can be applied causing the light blocking material 20 and the insert material 254 to laminate to the exterior surface 250 by melting or softening the polymer sealant layers 30 and 256.

At the same time, or subsequently, the exterior layer 252 can also be fed into the process and laminated to the other layers. For instance, the exterior layer 252 includes an adhesive layer 258 that adheres the exterior layer 252 to the other layers of the composite fabric.

Once the composite fabric 210 is produced as shown in FIG. 8, the composite fabric 210 can be used to produce the strip of material 210 as shown in FIG. 7. Referring to FIG. 7, for instance, the strip of material 210 includes the first exterior layer 250 that forms a front facing layer. The strip of material 210 further comprises the second exterior layer 252 which forms a backing layer. As shown, sandwiched between the first exterior layer 250 and the second exterior layer 252 are the insert material 254 and the light blocking material 20. The insert material 254, which may be transparent or translucent, is positioned within a facing segment 222 of the strip of material. The light blocking material 20, on the other hand, is positioned along the light blocking segment 220 of the strip of material 210. The light blocking material 20 extends past the crease or fold line 226.

As explained above, in one embodiment, the light blocking material 20 can be spaced from the insert material 254. As shown in FIG. 7, a space 260 is created where the first exterior layer 250 bonds directly to the second exterior layer 252. FIG. 7 has been exaggerated to show the break between the light blocking material 20 and the insert material 254. Due to the flexibility of the fabric and the thickness of the insert material, and the light blocking material, however, a substantially smooth and non-noticeable transition can generally occur at space 260 if desired.

A strip of material 210 as shown in FIG. 7 can then be used to produce the covering 100 as shown in FIGS. 1 and 6. In the embodiment illustrated in FIG. 7, the front and back of the strip of material 210 is made from a single continuous piece of fabric which not only improves the appearance of the composite material but also provides the material with a softer and more flexible feel. In addition, the strip of material 210 provides light blocking characteristics that may be desired in various applications. The strip of material 210, for instance, not only produces an overall decorative look, but also has excellent light blocking properties while protecting the light blocking material 20 from excessive wear during use.

Using the polymer sealant layer 30 as shown in FIG. 2A or 2B thus provides further functionality and versatility to the light blocking material 20. In particular, the polymer sealant layer can not only be used as an exterior layer of the composite film but also can be used to adhere the composite film to another layer, such as a fabric layer.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

In the foregoing Detailed Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below, vertical, horizontal, crosswise, radial, axial, clockwise, counterclockwise, and/or the like) are only used for identification purposes to aid the reader's understanding of the present subject matter, and/or serve to distinguish regions of the associated elements from one another, and do not limit the associated element, particularly as to the position, orientation, or use of the present subject matter. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

What is claimed:

1. A light blocking material for use in architectural coverings, the material comprising:
    a polymer film having a first side and a second and opposite side, the second side of the polymer film forming an exterior surface of the light blocking material;
    a single metalized layer, the single metalized layer being positioned on the first side of the polymer film, wherein the single metalized layer comprises a thickness of less than about 3000 angstroms;
    a metal protective layer adhered to the single metalized layer, the metal protective layer comprising a cured polymer and having a basis weight of from about 0.5 gsm to about 5 gsm, the metal protective layer comprising a cross-linked film comprising an acrylic polymer; and
    a finishing layer forming an exterior surface of the light blocking material opposite the exterior surface formed by the polymer film, the finishing layer comprising a fabric material or a colored polymer sealant layer.

2. The light blocking material as defined in claim 1, wherein the metal protective layer has a basis weight of from about 0.5 gsm to about 2.5 gsm.

3. The light blocking material as defined in claim 1, wherein the finishing layer comprises a fabric material, the fabric material being adhered to the metal protective layer by a polymer sealant layer.

4. The light blocking material as defined in claim 1, wherein the material contains eight layers or less.

5. An architectural covering comprising:
    a facing layer spaced from a backing layer, the backing layer being configured to face an architectural structure, the backing layer comprising the light blocking material as defined in claim 1.

6. A light blocking material for use in architectural coverings, the material comprising:
    a polymer film having a first side and a second and opposite side;
    a first metalized layer directly adjacent to the first side of the polymer film;
    a metal protective layer adhered to the first metalized layer, the metal protective layer comprising a cured polymer and having a basis weight of from about 0.5 gsm to about 5 gsm;
    a polymer sealant layer applied to the metal protective layer;
    a fabric material forming an exterior surface of the light blocking material, the fabric material being adjacent to the polymer sealant layer; and
    a second metalized layer directly adjacent to the second side of the polymer film.

7. The light blocking material as defined in claim 6, wherein the material contains 8 layers or less.

8. The light blocking material as defined in claim 6, wherein the metal protective layer comprises a printed layer, the metal protective layer comprising a cross-linked film comprising an acrylic polymer.

9. The light blocking material as defined in claim 6, wherein the metal protective layer has a basis weight of from about 0.5 gsm to about 2.5 gsm.

10. The light blocking material as defined in claim 6, wherein the polymer sealant layer comprises a thermoplastic polymer having a melting point of less than 170° C.

11. The light blocking material as defined in claim 6, wherein the polymer sealant layer comprises a polyethylene naphthalate.

12. The light blocking material as defined in claim 6, wherein the second metalized layer forms an exterior surface of the light blocking material opposite the exterior surface formed by the fabric material.

* * * * *